3,454,562
5 - CARBAMOYLSULFAMOYL - N - SUBSTITUTED-ANTHRANILIC ACIDS AND ESTERS THEREOF
Bernard Loev, Broomall, and James W. Wilson, Wayne, Pa., assignors to Smith Kline & French Laboratories, Philadelphia, Pa., a corporation of Pennsylvania
No Drawing. Filed Oct. 7, 1966, Ser. No. 584,982
Int. Cl. C07c 143/82; C07d 63/12, 29/34
U.S. Cl. 260—239.6                                  6 Claims

ABSTRACT OF THE DISCLOSURE 5-carbamoylsulfamoylanthranilic acid compounds, having diuretic and natriuretic activity and also useful in treating hypertension, are prepared by reacting a 5-sulfamoylanthranilic acid or ester thereof with an isocyanate, sodium cyanate or a carbamoyl chloride.

---

This invention relates to new 5-carbamoylsulfamoyl-N-substituted-anthranilic acids and esters thereof which have diuretic and natriuretic activity. These compounds are also useful in treating hypertension.

The new 5-carbamoylsulfamoyl-N-substituted-anthranilic acids and esters of this invention are represented by the following formula:

Formula I

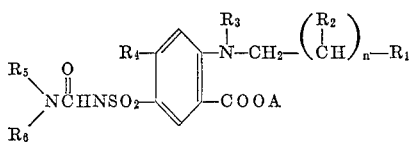

in which:

A is hydrogen, lower alkyl, phenyl or phenyl-lower alkyl;
$R_1$ is furyl, thienyl, phenyl, tetrahydrofuryl, tetrahydrothienyl, tetrahydropyranyl, tetrahydrothiapyranyl, 2-(3,4-dihydro-2H-pyranyl), cycloalkyl or cycloalkenyl;
$n$ is 0 or 1;
$R_2$ is hydrogen, lower alkyl or hydroxy;
$R_3$ is hydrogen or, when $R_1$ is phenyl and $n$ is 0, benzyl;
$R_4$ is chloro, bromo, fluoro or trifluoromethyl;
$R_5$ is hydrogen, lower alkyl, cycloalkyl or phenyl-lower alkyl; and
$R_6$ is hydrogen or, when $R_5$ is lower alkyl, lower alkyl or, when taken together with $R_5$ and the nitrogen atom to which they are attached, N-pyrrolidinyl or N-piperidyl.

Preferred compounds of Formula I are represented by the following formula:

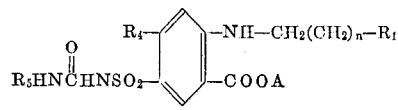

in which:

A is hydrogen, methyl or phenyl;
$R_1$ is 2-furyl, 2-thienyl, 2-(3,4-dihydro-2H-pyranyl) or 2-tetrahydropyranyl;
$n$ is 0 or 1;
$R_4$ is chloro or trifluoromethyl and
$R_5$ is hydrogen, lower alkyl, cyclopentyl or cyclohexyl.

The term "lower alkyl" where used herein denotes groups having 1–6, preferably 1–4, carbon atoms. The terms "cycloalkyl" and "cycloalkenyl" denote groups having preferably 5–6 carbon atoms.

Also included in this invention are pharmaceutically acceptable carboxylic acid salts of the anthranilic acids of Formula I prepared by reacting the anthranilic acid with an inorganic or organic base such as an alkali metal hydroxide, for example, sodium or potassium hydroxide, ammonia or benzylamine.

The compounds of this invention are prepared as follows:

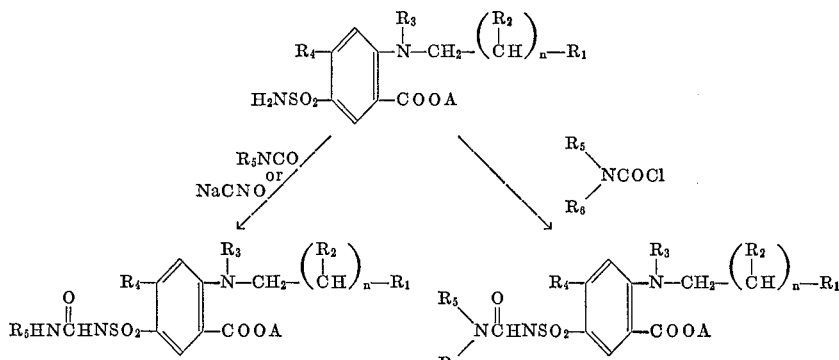

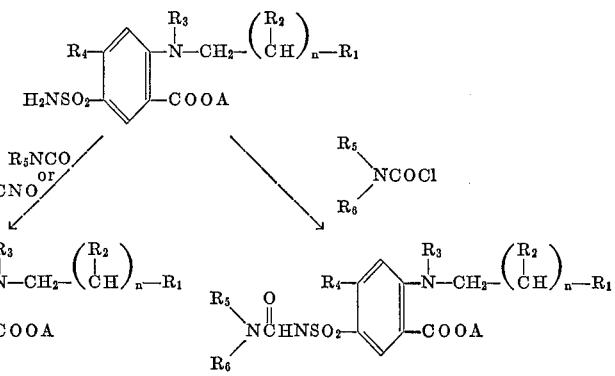

The terms A, $R_1$, $n$, $R_2$, $R_3$, $R_4$, $R_5$ and $R_6$ are as defined above.

According to the above procedures, compounds of this invention are prepared by reacting a 5-sulfamoyl-N-substituted-anthranilic acid or ester thereof with an isocyanate, sodium cyanate or a carbamoyl chloride.

When a lower alkyl, cycloalkyl or phenyl-lower alkyl isocyanate is used, the reaction is carried out in an aqueous solution or in an inert solvent such as acetone or a lower alkanol, for example ethanol, in the presence of a base such as an alkali metal hydroxide or carbonate or a tertiary amine, for example triethylamine, at about 0–45° C. Working up by concentrating, acidifying and filtering gives a 5-mono-substituted-carbamoysulfamoyl-N-substituted-anthranilic acid or ester of this invention.

When sodium cyanate is used the reaction is carried out at about room temperature in a solvent such as a lower alkanol, for example, ethanol or acetone or in aqueous solution containing an equimolar amount of a base such as an alkali metal hydroxide or carbonate.

When a carbamoyl chloride is used, the reaction is carried out in an inert solvent such as acetone or a lower alkanol, for example ethanol or isopropanol, in the presence of a base such as an alkali metal carbonate or hydroxide, for example sodium carbonate or sodium hydroxide. Preferably, about equimolar amounts of the 5-sulfamoyl-N-substituted-anthranilic acid or ester and the carbamoyl chloride are used.

The 5-sulfamoyl-N-substituted-anthranilic acid and ester starting materials are either known to the art or are prepared as follows:

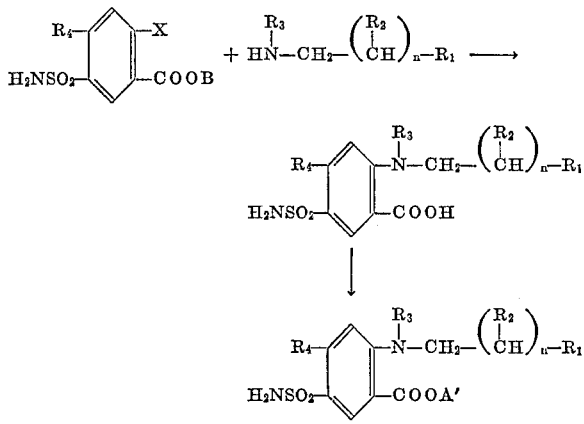

The terms $R_1$, $n$, $R_2$, $R_3$ and $R_4$ are as defined above; B is hydrogen or lower alkyl, A' is lower alkyl, phenyl or phenyl-lower alkyl and X is chloro, bromo or fluoro chosen so that when $R_4$ is chloro, X is chloro or fluoro; when $R_4$ is bromo, X is chloro, bromo or fluoro and when $R_4$ is fluoro, X is fluoro.

According to the above procedure, a 2-halo-4-$R_4$-5-sulfamoylbenzoic acid or lower alkyl ester thereof is reacted with an amine. The reaction is carried out at elevated temperature in a suitable solvent such as methoxyethanol, the dimethyl ether of diethylene glycol or dimethyl sulfoxide. Preferably, the benzoic acid is reacted with an excess of the amine. When a lower alkyl ester of the benzoic acid is employed, about an equimolar amount of the amine is used and a suitable less reactive organic base such as triethylamine may be used in the reaction as an acid acceptor. The anthranilic acid ester starting materials are prepared by reacting the acid with thionyl chloride in chloroform and reacting the resulting acid chloride with A'OH.

The 2-halo-4-$R_4$-5-sulfamoyl benzoic acid and lower alkyl esters thereof used to prepare the 5-sulfamoyl-N-substituted-anthranilic acid and ester starting materials are prepared by procedures I or II as follows:

I.

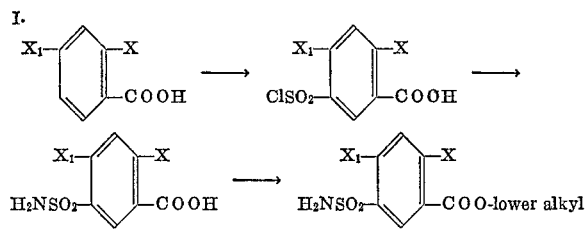

The term $X_1$ is hydrogen, chloro, bromo, fluoro, lower alkyl, lower alkoxy or nitro and X is chloro, bromo or fluoro chosen so that when $X_1$ is chloro, X is chloro or fluoro; when $X_1$ is bromo, X is chloro, bromo or fluoro and when $X_1$ is fluoro, X is fluoro.

II.

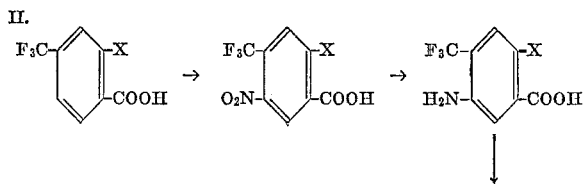

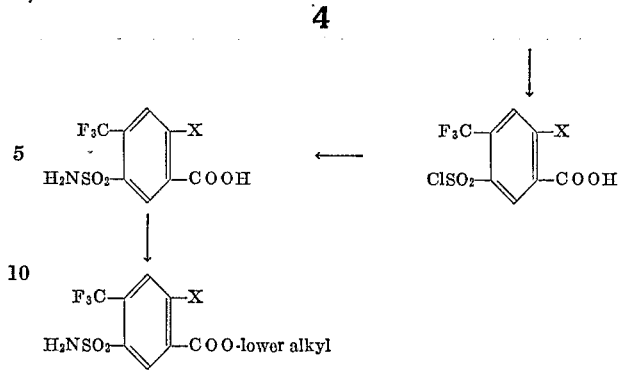

The term X is chloro, bromo or fluoro.

According to procedure I, a 2-halobenzoic acid is heated with an excess of chlorosulfonic acid and the resulting 5-chlorosulfonyl compound is treated with ammonium hydroxide to give a 2-halo-5-sulfamoylbenzoic acid. The lower alkyl esters are prepared by heating the benzoic acid with an excess of a lower alkanol in the presence of a mineral acid such as sulfuric acid.

According to procedure II, a 2-halo-4-trifluoro-methylbenzoic acid is treated with fuming sulfuric acid and fuming nitric acid to give a 2-halo-5-nitro-4-trifluoromethylbenzoic acid. The nitro group is reduced by treating with a chemical reducing agent such as iron powder in aqueous ammonium chloride solution to give a 5-amino-2-halo-4-trifluoromethylbenzoic acid. Treating this amino compound with concentrated hydrochloric acid and sodium nitrite followed by a solution of sulfur dioxide in acetic acid containing cuprous or cupric chloride and treating the resulting 5-chlorosulfonyl compound with ammonium hydroxide gives a 2-halo-5-sulfamoyl-4-trifluoromethylbenzoic acid. Esterifying the benzoic acid by heating with an excess of a lower alkanol in the presence of a mineral acid such as sulfuric acid gives the lower alkyl ester.

Alternatively, compounds of this invention are prepared by reacting a 2-halo-4-$R_4$-5-sulfamoylbenzoic acid or lower alkyl ester thereof with an isocyanate, sodium cyanate or carbamoyl chloride by the procedure described above for the reaction of a 5-sulfamoyl-N-substituted-anthranilic acid with an isocyanate, sodium cyanate or carbamoyl chloride and then reacting the resulting 5-carbamoylsulfamoyl-2-halo-4-$R_4$-benzoic acid with an amine having the formula

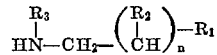

by the procedure described above for the reaction of a 5-sulfamoyl-N-substituted-anthranilic acid with an amine.

The following examples are not limiting but are illustrative of compounds of this invention and methods of preparing them.

EXAMPLE 1

A solution of 16.54 g. of 4-chloro-5-sulfamoyl-N-furfurylanthranilic acid in 110 ml. of 2 N aqueous sodium hydroxide is chilled to 8° C. To this solution is added 9.9 g. of n-butylisocyanate in 100 ml. of acetone, with stirring, over 30 minutes. The resulting solution is stirred at room temperature for 67 hours, then is concentrated to remove the acetone, chilled and acidified with 50% acetic acid. The solid material is filtered off and washed with water and ether, then dissolved in a hot mixture of isopropanol (100 ml.) and ethanol (200 ml.). The solution is treated with charcoal, filtered, then chilled and filtered to give 5-(n-butyl-carbamoyl)sulfamoyl - 4 - chloro-N-furfurylanthranilic acid.

EXAMPLE 2

By the procedure of Example 1 using the following in place of 4-chloro-5-sulfamoyl-N-furfurylanthranilic acid:

17.3 g. of 4-chloro-5-sulfamoyl-N-(2-thenyl)anthranilic acid 17.0 g. of 4-chloro-5-sulfamoyl-N-benzylanthranilic acid
20.8 g. of 4-chloro-5-sulfamoyl-N,N-dibenzylanthranilic acid the following products are obtained, respectively:

5-(n-butylcarbamoyl)sulfamoyl-4-chloro-N-(-thienyl)-anthranilic acid
5-(n-butylcarbamoyl)sulfamoyl-4-chloro-N-benzyl-anthranilic acid
5-(n-butylcarbamoyl)sulfamoyl-4-chloro-N,N-dibenzyl-anthranilic acid.

EXAMPLE 3

To 18 g. of 2,4-dichloro-5-sulfamoylbenzoic acid in 50 ml. of 2-methoxyethanol is added 33.1 g. of 2-(2-furyl)-ethylamine and 30 ml. of 2-methoxyethanol. The resulting solution is stirred and refluxed under nitrogen for five hours.

The reaction mixture is then poured into 500 ml. of ice water and the resulting mixture is acidified to pH 1 with hydrochloric acid, then chilled and stirred. The precipitate is filtered off, washed with ice water and dissolved in ethanol-water. The solution is treated with charcoal, filtered, then cooled and filtered to give 4-chloro-5-sulfamoyl-N-[2-(2-furyl)ethyl]anthranilic acid.

The above prepared anthranilic acid in sodium hydroxide solution is reacted with n-butylisocyanate in acetone by the procedure of Example 1 to give 5-(n-butylcarbamoyl)sulfamoyl - 4-chloro-N-[2-(2-furyl)ethyl]anthranilic acid.

Similarly reacting 2 - (2-tetrahydropyranyl)ethylamine and 2-(3-thienyl)ethylamine with 2,4-dichloro-5-sulfamoylbenzoic acid by the above procedure gives 4-chloro-5-sulfamoyl-N-[2-(2-tetrahydropyranyl)ethyl]anthranilic acid and 4 - chloro-5-sulfamoyl-N-[2-(3-thienyl)ethyl] anthranilic acid, respectively.

Reacting 4 - chloro - 5-sulfamoyl-N-[2-(2-tetrahydropyranyl)ethyl]anthranilic acid in 1 N sodium hydroxide solution with n-propylisocyanate in acetone by the procedure of Example 1 gives 4-chloro-5-(n-propylcarbamoyl)sulfamoyl-N-[2 - (2-tetrahydropyranyl)ethyl]anthranilic acid.

4-chloro-5-sulfamoyl-N-[2-(3-thienyl)ethyl]anthranilic acid in 1 N sodium hydroxide is treated with n-butylisocyanate in acetone and the resulting mixture is stirred at room temperature for four hours. After working up as in Example 1, 5-(n-butylcarbamoyl)sulfamoyl-4-chloro-N-[2-(3-thienyl)ethyl)ethyl]anthranilic acid is obtained.

EXAMPLE 4

A solution of 7.8 g. of sodium borohydride and 50 g. of 2-isopropenylfuran in 250 ml. of the dimethyl ether of diethylene glycol is treated at 0–5° C. under nitrogen with 39 g. of boron trifluoride etherate. The solution is then stirred at room temperature for three hours. A solution of 62.2 g. of hydroxylamine-o-sulfuric acid in 250 ml. of the dimethyl ether of diethylene glycol is added and the mixture is heated at 100° C. for three hours. The cooled solution is treated with 200 ml. of concentrated hydrochloric acid and 2 l. of water. The solution is extracted with ether and then made strongly alkaline with sodium hydroxide. Extraction with ether and distillation gives 2-(2-furyl)propylamine.

Reacting the above prepared amine with 2,4-dichloro-5-sulfamoylbenzoic acid by the procedure of Example 3 gives 4 - chloro-5-sulfamoyl-N-[2-(2-furyl)propylamino] anthranilic acid.

The above prepared anthranilic acid in sodium hydroxide solution is reacted with n-butylisocyanate in acetone by the procedure of Example 1 to give 5-(n-butylcarbamoyl)sulfamoyl-4-chloro-N-[2-(2-furyl)propylamino]-anthranilic acid.

A sample of the above prepared anthranilic acid is treated with with an equimolar amount of sodium hydroxide in water to give, after removing the water in vacuo, the sodium salt of 5 - (n-butylcarbamoyl)sulfamoyl-4-chloro-N-[2-(2-furyl)-propylamino-7-anthranilic acid.

EXAMPLE 5

A suspension of 24 g. of sodium hydride in 500 ml. of dimethyl sulfoxide is heated at 80° C. for one hour and then cooled to 5° C. A solution of 357 g. of methyltriphenylphosphonium bromide in 1 l. of warm dimethyl sulfoxide is added and the solution stirred at room temperature for 15 minutes. Methyl 2-tetrahydrofuryl ketone (114 g.) is added and the solution is stirred overnight at room temperature. The reaction mixture is diluted with 2 l. of water and extracted with hexane. The hexane extract is dried and distilled to give 2-isopropenyltetrahydrofuran.

By the procedure of Example 4, using 2-isopropenyltetrahydrofuran in the place of 2-isopropenylfuran, 4-chloro-5-sulfamoyl-N-([2-(2-tetrahydrofuryl)propyl]anthranilic acid is obtained.

Reacting the above prepared anthranilic acid in sodium hydroxide solution with methylisocyanate in acetone by the procedure of Example 1 gives 5-(n-butylcarbamoyl)-sulfamoyl - 4-chloro-N-[2-(2-tetrahydrofuryl)propyl]anthranilic acid.

By the above procedure, using in place of methyl 2-tetrahydrofuryl ketone the following: 1-(2-furyl)-1-pentanone, 1-(2-thienyl)-1-pentanone, the following products are obtained, respectively.

5-(n-butylcarbamoyl)sulfamoyl-4-chloro-N-[2-(2-furyl) hexyl]anthranilic acid
5-(n-butycarbamoyl)sulfamoyl-4-chloro-[2-(2-thienyl) hexyl]anthranilic acid.

EXAMPLE 6

Using 38.1 g. of 2-amino-1-(2-furyl)ethanol in place of 2-(2-furyl)ethylamine in the procedure of Example 3, 5-(n-butylcarbamoyl)sulfamoyl - 4 - chloro-N-[2-(2-furyl)-2-hydroxyethyl]anthranilic acid is obtained.

EXAMPLE 7

Five grams of 2-bromo-4-trifluoromethylbenzoic acid is added with stirring to 31 g. of fuming 30% sulfuric acid. To this mixture is added dropwise 7.7 g. of fuming nitric acid keeping the temperature below 70° C. The mixture is heated with stirring on a steam bath for two hours, then treated with a large excess of ice water and filtered to give 2-bromo-5-nitro-4-trifluoromethylbenzoic acid.

To a mixture of 4.8 g. of iron powder and a solution of 2.5 g. of ammonium chloride in 40 ml. of water at 50° C. is added 4.5 g. of 2-bromo-5-nitro-4-trifluoromethylbenzoic acid. The resulting mixture is heated on a steam bath with stirring for three hours, then treated with 10% sodium carbonate, filtered, neutralized with concentrated hydrochloric acid, allowed to stand, cooled and filtered to give 5-amino-2-bromo-4-trifluoromethylbenzoic acid.

To a suspension of 4.3 g. of 5-amino-2-bromo-4-trifluoromethylbenzoic acid in 10 ml. of concentrated hydrochloric acid at 6° C. is added slowly with stirring a solution of 1.14 g. of sodium nitrate in 60 ml. of water. The resulting cold mixture is poured with stirring into 15 ml. of a saturated solution of sulfur dioxide in 15 ml. of acetic acid containing 0.2 g. of cuprous chloride. The solid material is filtered off, washed with water and then added with stirring to an excess of ammonium hydroxide. After stirring at room temperature for two hours, the solution is made acid with concentrated hydrochloric acid and the 2-bromo - 5 - sulfamoyl-4-trifluoromethylbenzoic acid is filtered off, washed with water and dried.

A mixture of 5.2 g. of 2-bromo-5-sulfamoyl-4-trifluoromethylbenzoic acid and 5.8 g. of furfurylamine in 50 ml. of ethylene glycol monomethyl ether is heated at reflux for three hours and then stirred into 250 ml. of 1 N hydrochloric acid. The solid material is filtered off, washed with water and dissolved in 50 ml. of 1 N sodium bicarbonate. The solution is filtered, acidified with concentrated hydrochloric acid and filtered to give N-furfuryl-5-sulfamoyl-4-trifluoromethylanthranilic acid.

By the procedure of Example 1 the above prepared anthranilic acid in sodium hydroxide solution is reacted with n-butylisocyanate in acetone to give 5-(n-butylcarbamoyl)sulfamoyl - 4 - trifluoromethyl-N-furfurylanthranilic acid.

EXAMPLE 8

By the procedure of Example 1, using in place of n-butylisocyanate, 0.1 mole of cyclohexylisocyanate, benzylisocyanate, phenethylisocyanate, the products are, respectively:

4-chloro-5-(cyclohexylcarbamoyl)sulfamoyl-N-furfurylanthranilic acid 5-(benzylcarbamoyl)sulfamoyl-4-chloro-N-furfurylanthranilic acid 4-chloro-5-(phenethylcarbamoyl)sulfamoyl-N-furfurylanthranilic acid.

EXAMPLE 9

A mixture of 3.3 g. of 4-chloro-5-sulfamoyl-N- furfurylanthranilic acid, 1.1 g. of dimethylcarbamoyl chloride and 0.7 g. of sodium hydroxide in acetone is stirred at room temperature for three hours. Concentrating in vacuo, acidifying and filtering gives 4-chloro-5-(dimethylcarbamoyl)sulfamoyl-N-furfurylanthranilic acid.

Using 1.4 g. of diethylcarbamoyl chloride in place of dimethylcarbamoyl chloride in the above procedure, 4-chloro - 5 - (diethylcarbamoyl)sulfamoyl-N-furfurylanthranilic acid is obtained.

EXAMPLE 10

By the procedure of Example 9, 4-chloro-5-sulfamoyl-N-furfurylanthranilic acid is reacted with an equimolar amount of 1-piperidinecarbonyl chloride in the presence of sodium hydroxide in ethanol to give 4-chloro-5-(1-piperidylcarbonyl)sulfamoyl-N-furfurylanthranilic acid.

In the same manner 4-chloro - 5 - sulfamoyl-N-[2-(2-furyl)ethyl]anthranilic acid (prepared as in Example 3) is reacted with 1-pyrrolidinecarbonyl chloride to give 4-chloro - 5 - (1-pyrrolidylcarbonyl)sulfamoyl-N-[2-(2-furyl)ethyl]anthranilic acid.

EXAMPLE 11

By the procedure of Example 3 using the following amines in place of 2-(2-furyl)ethylamine: 2-tetrahydropyranylmethylamine, 2-aminomethyl - 3,4 - dihydro-2H-pyran, 3-chlorobenzylamine, cyclopentylmethylamine, 3-cyclohexene - 1 - methylamine, 2-tetrahydrothienylmethylamine, the following products are obtained respectively:

5-(n-butylcarbamoyl)sulfamoyl-4-chloro-N-(2-tetrahydropyranyl)methylanthranilic acid 5-(n-butylcarbamoyl)sulfamoyl-4-chloro-N-[2-(3,4-dihydro-2H-pyranyl)]methylanthranilic acid 5-(n-butylcarbamoyl)sulfamoyl-4-chloro-N-(3-chlorobenzyl)anthranilic acid 5-(n-butylcarbamoyl)sulfamoyl-4-chloro-N-cyclopenylmethylanthranilic acid 5-(n-butylcarbamoyl)sulfamoyl-4-chloro-N-(3-cyclohexenyl)methylanthranilic acid 5-(n-butylcarbamoyl)sulfamoyl-4-chloro-N-(2-tetrahydrothienyl)methylanthranilic acid.

EXAMPLE 12

To a solution of 14.6 g. of 2-tetrahydrothiapyrancarboxylic acid in 100 ml. of toluene is added 10.1 g. of triethylamine. To this mixture at −5° C. to −10° C. is added dropwise with stirring 10.9 g. of ethyl chloroformate. After stirring at 0° C. for 30–60 minutes the triethylamine hydrochloride which forms is removed by filtration. To the filtrate is added at 0° C. with stirring a solution of an excess of ammonia in toluene. The resulting toluene solution after standing at 0–30° C. for several hours is washed with water and with a dilute aqueous solution of sodium carbonate. The toluene is removed in vacuo to give 2-tetrahydrothiapyrancarboxylic acid amide.

Lithium aluminum hydride (8.36 g.) is crushed under dry ether and then stirred under reflux with 400 ml. of dry ether for two hours. After cooling to 0° C., a solution of 16.0 g. of 2-tetrahydrothiapyrancarboxylic acid amide in 100 cc. of dry ether is added dropwise with stirring. After completion of the addition, the mixture is refluxed for 30–60 minutes, then cooled to 0° C. Water (8 ml.) is added dropwise with stirring followed by 6 ml. of 6 N sodium hydroxide and then an additional 28 ml. of water. The organic layer is separated and dried over anhydrous sodium sulfate. The sodium sulfate is removed by filtration, the solvent is removed in vacuo and the residue distilled to give 2-tetrahydrothiapyranylmethylamine.

By the procedure of Example 3 using the above prepared 2-tetrahydrothiapyranylmethylamine in place of 2-(2-furyl)ethylamine, 5-(n-butylcarbamoyl)sulfamoyl - 4 - chloro - N - (2 - tetrahydrothiapyranyl)methylanthranilic acid is obtained.

Similarly, using 14.6 g. of 3-tetrahydrothiapyrancarboxylic acid in the above procedure, the product is 5-(n-butylcarbamoyl)sulfamoyl-4-chloro-N-(3 - tetrahydrothiapyranyl)methylanthranilic acid.

EXAMPLE 13

A mixture of 20 g. of 3-tetrahydropyrancarboxylic acid, 100 ml. of methanol and 5 ml. of concentrated sulfuric acid is refluxed for two hours, then cooled and filtered to give methyl 3-tetrahydropyrancarboxylate.

To 100 ml. of a saturated solution of ammonia in methanol is added 14.4 g. of methyl 3-tetrahydropyrancarboxylate. The resulting solution is kept at room temperature for three days. Removal of the solvent and excess ammonia in vacuo gives 3-tetrahydropyrancarboxylic acid amide.

The above prepared 3-tetrahydropyrancarboxylic acid amide is reduced by the procedure of Example 12 using lithium aluminum hydride in dry ether to give 3-tetrahydropyranylmethylamine.

By the procedure of Example 3 using the above prepared 3-tetrahydropyranylmethylamine in place of a 2-(2-furyl)ethylamine, the product is 5-(n-butylcarbamoyl)sulfamoyl - 4 - chloro - N - (3 - tetrahydropyranyl)methylanthranilic acid.

EXAMPLE 14

To a stirred refluxing mixture of 4.3 g. of 5-(n-butylcarbamoyl)sulfamoyl - 4 - chloro - N - furfurylanthranilic acid (prepared as in Example 1), 35 ml. of dry benzene and 2 drops of pyridine under nitrogen is added 5.9 g. of thionyl chloride. The resulting mixture is refluxed for 30 minutes and filtered hot. Hexane is added and the mixture is chilled and filtered to give the anthranilic acid chloride. This acid chloride and 125 ml. of absolute methanol are heated on a steam bath for 30 minutes, then cooled and filtered to give methyl 5-(n-butylcarbamoyl)sulfamoyl-4-chloro-N-furfurylanthranilate.

By the same procedure using, in place of methanol, ethanol, n-butanol, n-hexanol, benzyl alcohol and 2-phenylethanol the corresponding ethyl, n-butyl, n-hexyl, benzyl and phenethyl esters are obtained.

EXAMPLE 15

A mixture of 6.0 g. of 5-(n-butylcarbamoyl)sulfamoyl-4-chloro-N-furfurylanthranilic acid chloride, 1.6 g. of pyridine, 1.8 g. of phenol and 50 ml. of benzene is heated on a steam bath for 15 minutes, then cooled, washed with water, dried over sodium sulfate, concentrated and filtered to give phenyl 5-(n-butylcarbamoyl)sulfamoyl-4-chloro-N-furfurylanthranilate.

EXAMPLE 16

A mixture of 16.2 g. of 2,4-difluorobenzoic acid and 58 g. of chlorosulfonic acid is heated to 160° C., then cooled and poured into ice water. Filtering gives 2,4-difluoro-5-chlorosulfonylbenzoic acid which is treated with a cold ammonium hydroxide solution. Concentrating the resulting mixture in vacuo, then acidifying with hydrochloric acid and filtering gives 2,4-difluoro-5-sulfamoylbenzoic acid.

To 11.9 g. of 2,4-difluoro-5-sulfamoylbenzoic acid in 110 ml. of 2 N aqueous sodium hydroxide at 8° C. is added 9.9 g. of n-butylisocyanate in 100 ml. of ethanol and the resulting mixture is stirred at room temperature for 12 hours. The mixture is concentrated, cooled, acidified with 50% acetic acid and filtered. The solid material is recrystallized from aqueous ethanol to give 5-(n-butylcarbamoyl)sulfamoyl-2,4-difluorobenzoic acid.

Reacting the above prepared compound with furfurylamine in 2-methoxyethanol by the procedure of Example 1 gives 5 - (n-butylcarbamoyl)sulfamoyl-4-fluoro-N-furfurylanthranilic acid.

EXAMPLE 17

By the procedure of Example 16 using 2,4-dibromo-5-sulfamoylbenzoic acid the product is 4-bromo-5-(n-butylcarbamoyl)sulfamoyl-N-furfurylanthranilic acid.

The above prepared anthranilic acid is treated with an equimolar amount of benzylamine in methanol at room temperature to give, after removing the methanol in vacuo, the benzylamine salt of 4-bromo-5-(n-butylcarbamoyl)sulfamoyl-N-furfurylanthranilic acid.

EXAMPLE 18

A mixture of 3.3 g. of 4-chloro-5-sulfamoyl-N-furfurylanthranilic acid and 0.65 g. of sodium cyanate in 75 ml. of ethanol is stirred at room temperature for 24 hours. The mixture is concentrated to dryness in vacuo and the residue is recrystallized from aqueous ethanol to give 5-carbamoylsulfamoyl - 4 - chloro - N - furfurylanthranilic acid.

What is claimed is:
1. A compound of the formula

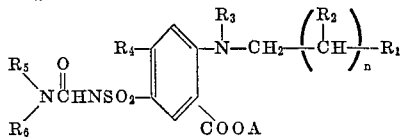

in which:
A is hydrogen or lower alkyl;

$R_1$ is 2-furyl, 2-thienyl, 3-thienyl, phenyl, 2-tetrahydrofuryl, 2-tetrahydrothienyl, 2-tetrahydropyranyl, 3-tetrahydropyranyl, 2-tetrahydrothiapyranyl, 3-tetrahydrothiapyranyl, 2-(3,4-dihydro-2H-pyranyl), cycloalkyl having 5–6 carbon atoms or cycloalkenyl having 5–6 carbon atoms;

$n$ is 0 or 1;

$R_2$ is hydrogen, lower alkyl or hydroxy;

$R_3$ is hydrogen or, when $R_1$ is phenyl and $n$ is 0, benzyl;

$R_4$ is chloro, bromo, fluoro or trifluoromethyl;

$R_5$ is lower alkyl, cycloalkyl having 5–6 carbon atoms or phenyl-lower alkyl; and $R_6$ is hydrogen or, when $R_5$ is lower alkyl, lower alkyl or, when taken together with $R_5$ and the nitrogen atom to which they are attached, N-pyrrolidinyl or N-piperidyl and, when A is hydrogen, a pharmaceutically acceptable carboxylic acid salt thereof.

2. A compound according to claim 1 in which A is hydrogen, $R_1$ is 2-furyl, $n$ is 0, $R_3$ is hydrogen, $R_4$ is chloro, $R_5$ is lower alkyl and $R_6$ is hydrogen.

3. A compound according to claim 1 in which A is hydrogen, $R_1$ is 2-furyl, $n$ is 0, $R_3$ is hydrogen, $R_4$ is chloro, $R_5$ is n-butyl $R_6$ is hydrogen.

4. A compound according to claim 1 in which A is hydrogen, $R_1$ is 2-furyl, $n$ is 0, $R_3$ is hydrogen, $R_4$ is trifluoromethyl, $R_5$ is lower alkyl and $R_6$ is hydrogen.

5. A compound according to claim 1 in which A is hydrogen, $R_1$ is 2-tetrahydropyranyl, $n$ is 0, $R_3$ is hydrogen, $R_4$ is chloro, $R_5$ is lower alkyl and $R_6$ is hydrogen.

6. A compound according to claim 1 in which A is hydrogen, $R_1$ is 2-(3,4-dihydro-2H-pyranyl), $n$ is 0, $R_3$ is hydrogen, $R_4$ is cholor, $R_5$ is lower alkyl and $R_6$ is hydrogen.

No references cited.

HENRY R. JILES, *Primary Examiner.*

C. M. SHURKO, *Assistant Examiner.*

U.S. Cl. X.R.

260—239.8, 239.65, 397.7, 470, 516, 519, 521, 999